US012756727B2

(12) United States Patent
Rahman et al.

(10) Patent No.: US 12,756,727 B2
(45) Date of Patent: Oct. 6, 2026

(54) IDENTIFYING SIMILARITIES IN COMPLEX OBJECTS AT SCALE

(71) Applicant: Microsoft Technology Licensing, LLC, Redmond, WA (US)

(72) Inventors: Alyssa Nicole Rahman, Washington, DC (US); Austin Lyman Baker, Houston, TX (US); Anna Swanson Bertiger, Seattle, WA (US); Nicholas Thomas Deneweth, Lake Orion, MI (US); Tyler Anthony Smith, Richardson, TX (US); Naresh Krishnamoorthy, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 18/400,987

(22) Filed: Dec. 29, 2023

(65) Prior Publication Data

US 2025/0088521 A1 Mar. 13, 2025

Related U.S. Application Data

(60) Provisional application No. 63/537,768, filed on Sep. 11, 2023.

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC ............. H04L 63/1425; H04L 63/1441; H04L 63/1416; G06F 21/554; G06F 21/602; G06F 21/577; G06F 21/564; G06F 21/55; G06F 21/57
See application file for complete search history.

(56) References Cited

U.S. PATENT DOCUMENTS

| | | | |
|---|---|---|---|
| 9,166,997 | B1 | 10/2015 | Guo et al. |
| 9,369,484 | B1 | 6/2016 | Lacerte |
| 9,852,231 | B1 | 12/2017 | Ravi et al. |
| 9,898,604 | B2 | 2/2018 | Fang et al. |
| 10,015,186 | B1 | 7/2018 | Tamir |
| 10,263,998 | B1 | 4/2019 | Bhatt |

(Continued)

FOREIGN PATENT DOCUMENTS

WO 2017024058 A1 2/2017

OTHER PUBLICATIONS

Final Office Action mailed on Feb. 5, 2025, in U.S. Appl. No. 17/683,257, 15 pages.

(Continued)

*Primary Examiner* — Abu S Sholeman

(74) *Attorney, Agent, or Firm* — Schwegman Lundberg & Woessner, P.A.

(57) ABSTRACT

Described are systems and methods for measuring the similarity of security alerts, security incidents, or other complex data structures at scale using machine-learned signature vectors suitable for efficient similarity-based filtering in conjunction with hashes of the security alerts for more detailed comparisons. In some embodiments, similarity measurements between security incidents are used to base the processing of a current security incident on similar prior security incidents.

20 Claims, 6 Drawing Sheets

(56) References Cited

U.S. PATENT DOCUMENTS

| | | | | |
|---|---|---|---|---|
| 10,333,952 | B2 | 6/2019 | Chen | |
| 10,521,584 | B1 | 12/2019 | Sharifi Mehr | |
| 10,771,492 | B2 | 9/2020 | Hudis et al. | |
| 10,785,237 | B2 | 9/2020 | Mestha | |
| 10,798,113 | B2 | 10/2020 | Muddu et al. | |
| 10,958,667 | B1 | 3/2021 | Maida et al. | |
| 11,032,303 | B1 | 6/2021 | Efstathopoulos | |
| 11,218,357 | B1 * | 1/2022 | Salinas | H04L 43/0817 |
| 11,657,387 | B2 | 5/2023 | Delhoste | |
| 11,693,959 | B2 * | 7/2023 | Silberman | G06F 21/554 726/22 |
| 12,081,569 | B2 * | 9/2024 | Shahul Hameed | H04L 63/1425 |
| 2016/0205122 | A1 * | 7/2016 | Bassett | H04L 63/1441 726/23 |
| 2017/0063909 | A1 | 3/2017 | Muddu | |
| 2017/0302685 | A1 | 10/2017 | Ladnai | |
| 2017/0329964 | A1 * | 11/2017 | Ikeda | G06F 21/55 |
| 2018/0103052 | A1 | 4/2018 | Choudhury | |
| 2018/0137155 | A1 | 5/2018 | Majumdar | |
| 2018/0157705 | A1 | 6/2018 | Robichaud | |
| 2018/0196861 | A1 | 7/2018 | Lee | |
| 2018/0329958 | A1 | 11/2018 | Choudhury et al. | |
| 2019/0342307 | A1 | 11/2019 | Gamble et al. | |
| 2020/0089765 | A1 * | 3/2020 | Jayaraman | G06N 3/084 |
| 2020/0134076 | A1 | 4/2020 | Ogrinz | |
| 2020/0151326 | A1 * | 5/2020 | Patrich | G06F 21/554 |
| 2020/0233864 | A1 | 7/2020 | Jin | |
| 2020/0242139 | A1 | 7/2020 | Neels et al. | |
| 2020/0304462 | A1 | 9/2020 | Kopp | |
| 2020/0374179 | A1 | 11/2020 | Arrabolu et al. | |
| 2021/0073285 | A1 | 3/2021 | Hunter | |
| 2021/0152581 | A1 * | 5/2021 | Hen | G06F 21/604 |
| 2021/0350248 | A1 | 11/2021 | Rogers | |
| 2021/0374237 | A1 * | 12/2021 | Momeni Milajerdi | G06F 21/554 |
| 2022/0210202 | A1 | 6/2022 | Crabtree | |
| 2022/0210220 | A1 | 6/2022 | Shivanna | |
| 2022/0224724 | A1 | 7/2022 | Bazalgette | |
| 2022/0292186 | A1 * | 9/2022 | Givental | G06F 21/554 |
| 2023/0086863 | A1 * | 3/2023 | Silberman | G06F 21/554 726/22 |
| 2023/0129144 | A1 | 4/2023 | Charles | |
| 2023/0275907 | A1 | 8/2023 | Bertiger | |
| 2023/0275908 | A1 | 8/2023 | Mace | |
| 2023/0289438 | A1 * | 9/2023 | Silberman | G06F 21/554 |
| 2024/0152622 | A1 * | 5/2024 | Xia | G06F 21/552 |
| 2024/0205245 | A1 * | 6/2024 | Singhal | H04L 63/1425 |
| 2026/0100856 | A1 * | 4/2026 | Fortkort | G06N 3/0455 |

OTHER PUBLICATIONS

Non-Final Office Action mailed on Mar. 20, 2025, in U.S. Appl. No. 17/683,266, 29 pages.

Non-Final Office Action mailed on Sep. 24, 2024, in U.S. Appl. No. 17/683,257, 14 pages.

Non-Final Office Action mailed on Feb. 27, 2024, in U.S. Appl. No. 17/683,257, 14 pages.

"About the D3FEND Knowledge Graph Project", Retrieved from: https://d3fend.mitre.org/about/, Retrieved on: Jan. 12, 2022, 2 Pages.

"Create Protected PDFs from Office Files", Retrieved from: https://support.microsoft.com/en-us/topic/create-protected-pdfs-from-office-files-aba7e367-e482-49e7-b746-a385e48d01e4, Retrieved On: Sep. 19, 2023, 2 Pages.

"International Search Report and Written Opinion Issued in PCT Application No. PCT/US2023/010903", Mailed Date: May 10, 2023, 14 Pages.

"International Search Report and Written Opinion Issued in PCT Application No. PCT/US2023/011960", Mailed Date: Apr. 13, 2023, 9 Pages.

"MinHash LSH", Retrieved from: https://ekzhu.com/datasketch/lsh.html, Retrieved On: Sep. 19, 2023, 9 Pages.

"TLSH—A Locality Sensitive Hash", Retrieved from: https://tlsh.org/, Retrieved On: Sep. 19, 2023, 1 Page.

Brown, et al., "Language Models are Few-Shot Learners", In Repository of arXiv:2005.14165v4, Jul. 22, 2020, pp. 1-75.

Cheng, et al., "Discovering Attack Scenarios via Intrusion Alert Correlation Using Graph Convolutional Networks", In Journal of IEEE Communications Letters, vol. 25, Issue 5, May 2021, pp. 1564-1567.

Davies, et al., "Automated Investigation and Response in Microsoft 365 Defender", Retrieved from: https://docs.microsoft.com/en-us/microsoft365/security/defender/m365d-autoir?view=o365-worldwide, Oct. 6, 2021, 4 Pages.

Hamilton, et al., "Inductive Representation Learning on Large Graphs", In Repository of arXiv:1706.02216v4, Sep. 10, 2018, 19 Pages.

Levin, et al., "Security Orchestration, Automation, and Response (SOAR) in Microsoft Sentinel", Retrieved from: https://docs.microsoft.com/en-us/azure/sentinel/automation, Nov. 18, 2021, 3 Pages.

Non-Final Office Action mailed on Jan. 19, 2024, in U.S. Appl. No. 17/683,266, 21 pages.

Wang, et al., "Language Models are Open Knowledge Graphs", In Repository of arXiv:2010.11967v1, Oct. 22, 2020, 30 Pages.

Yasunaga, Michihiro, "Reasoning with Language Models and Knowledge Graphs for Question Answering", Retrieved from: http://ai.stanford.edu/blog/qagnn/, Jul. 12, 2021, 5 Pages.

Zhang, et al., "Multi-Step Attack Detection Based on Pre-Trained Hidden Markov Models", In Journal of Sensors, vol. 22, Issue 8, Apr. 8, 2022, pp. 1-18.

Final Office Action mailed on Aug. 9, 2024, in U.S. Appl. No. 17/683,266, 26 pages.

Final Office Action mailed on Jun. 10, 2024, in U.S. Appl. No. 17/683,257, 14 pages.

Final Office Action mailed on Oct. 1, 2025, in U.S. Appl. No. 17/683,266, 29 pages.

Notice of Allowance mailed on Jan. 6, 2026, in U.S. Appl. No. 17/683,266 (Ms# 410943-US01), 09 Pages.

* cited by examiner

IDENTIFYING SIMILARITIES IN COMPLEX OBJECTS AT SCALE

CLAIM OF PRIORITY

This patent application claims the benefit of U.S. Provisional Patent Application No. 63/537,768, filed Sep. 11, 2023, which is incorporated by reference herein in its entirety.

BACKGROUND

Commercial enterprises and other organizations that operate large computer networks typically employ a number of hardware- or software-based network security tools to monitor network communications and activity and guard against cybersecurity threats. These tools generate significant amounts of data, including routine logs of monitored activity as well as security alerts triggered by anomalous or otherwise suspicious activity, which can be analyzed in an effort to detect attacks early and thwart attempted network intrusions, or in the event a breach does occur, to isolate the affected network portions, stop the attack, and prevent future incursions. Hunting for threats amidst a mass of background noise generally starts with identifying malicious patterns in the data. Seasoned security professionals are skilled at recognizing similarities between a current investigation and historical incidents and alerts. However, institutionalizing and scaling this expertise is difficult, and when senior responders leave an organization, they take a large foundation of knowledge that new responders must re-learn.

DESCRIPTION

Figure 1:
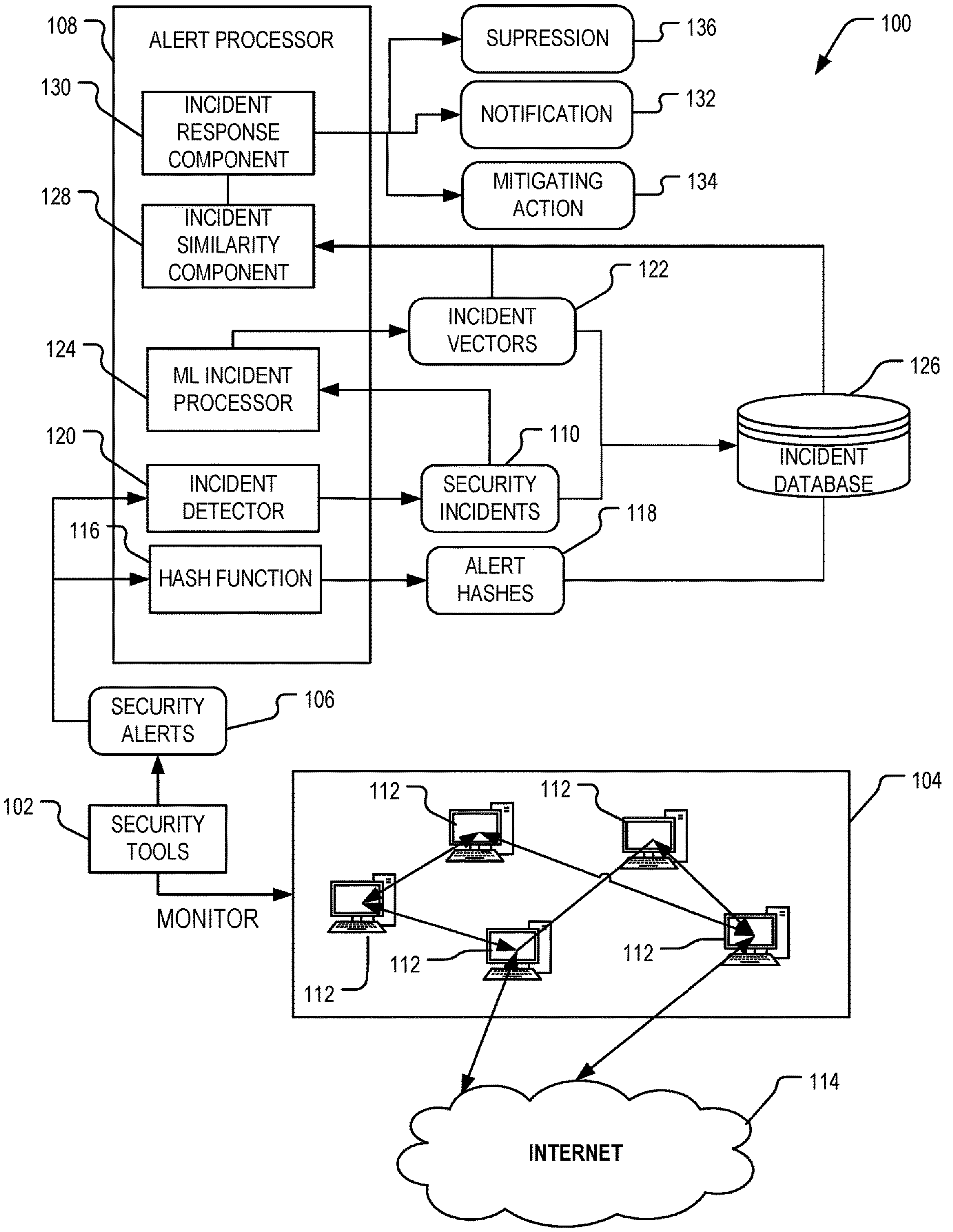
FIG. 1 is a block diagram of an example network security system for monitoring and processing security incidents, which may involve measuring and using the similarity between security incidents in accordance with various embodiments.

Described herein are systems and methods for measuring the similarity of security alerts, security incidents, or other complex data structures at scale, making security investigations more efficient, effective, and accessible. A "security alert," as used herein, is a notification, generally manifested in an associated data record, of an event or change in a computer network that impacts security. A "security incident," as herein understood, is a cluster or group of security alerts that are, e.g., by virtue of relationships or similarities between the alerts, deemed to correspond to a single cyberattack. Measures of similarity between security alerts and/or security incidents can be useful in many complex security tasks. For instance, they may facilitate leveraging experience with prior incidents to discover, process, and respond to ongoing threats, as well as identifying emerging campaigns and tracking threat actors. Measuring similarity between security incidents allows, for example, grouping incidents for purposes of faster triage or joint analysis, and leveraging knowledge about previous security incidents as context when processing a newly discovered incident; both can serve to reduce the analysis burden on human security analysts and/or the machine resources used in automated analysis, and/or to improve the accuracy of security threat classification and suitability of any mitigating or other actions taken in response, especially when classification and response selection are automated.

In various embodiments, similarity between alerts or incidents is measured based on vector representations computed with a machine-learned model trained on large amounts of security data, hereinafter also "signature vectors," in combination with locality-sensitive hashes computed from data associated with the alerts. The signature vectors may, for instance, reflect membership of the alerts in learned clusters, in some cases for multiple separate cluster sets each derived from the entirety of the training data. To create an incident signature vector representing the incident as a whole, these cluster memberships may be aggregated over the constituent alerts of each incident. The alert or incident signature vectors can serve as a coarse "fast filter" for dissimilar data, e.g., using dot products between pairs of signature vectors as a measure of similarity. Following such filtering, a richer comparison can be performed based on the hashed data. For example, in determining similarity between two incidents, comparisons between the alert-level hashes of the alerts of both incidents within each cluster can be combined with the alert counts of the clusters for both incidents to provide a partial matching of very similar incidents (e.g., including an identification of highly similar alerts in both incidents). The combination of a coarse filter with a finer, more complex similarity metric results in a similarity determination that is both interpretable and relatively efficient.

In some embodiments, security alerts are aggregated across security incidents, multiple organizations, and/or extended periods of time; filtered based on a first set of attributes to retain only security alerts relevant to a particular investigation (e.g., only security alerts of a particular type resulting from a newly emerging threat exploiting a particular vulnerability); and grouped based on a second set of attributes (e.g., association with a machine, organization, or time window). The alert data associated with the alerts within each group is then processed to ultimately compute a locality-sensitive hash for the group. Emerging cyberattacks and trends can be discovered based on similarity between different alert groups (e.g., associated with different organizations), as determined in terms of the locality-sensitive hashes, optionally after coarse filtering based on signature vectors of the alert groups determined based on learned clusters in a similar manner as described above.

FIG. 1 is a block diagram of an example network security system 100 for monitoring and processing security incidents, which may involve measuring and using the similarity between security incidents in accordance with various embodiments. The system 100 includes one or more network security tools 102 that monitor the communications and activities within a computer network 104 to generate security alerts 106, and a computational component herein termed the "alert processor" 108 for processing the alerts 106, both individually and as clustered into security incidents 110.

The computer network 104 includes multiple (e.g., often a large number of) computing machines 112, which can be accessed by users, store files, execute programs, and communicate with each other as well as with machines outside the organization via suitable wired or wireless network connections. In some embodiments, internal communications within the computer network 104 take place via a local area network (LAN) implemented, e.g., by Ethernet or Wi-Fi, or via a private wide area network (WAN) implemented, e.g., via optical fiber or circuit-switched telephone lines. External communications may be facilitated via the Internet 114. The computing machines 112 within the computer network 104 may include, e.g., servers, desktop or laptop computers, mobile devices (e.g., smartphones, tablets, personal digital assistants (PDAs)), Internet-of-things devices, etc. The computer network 104 may be dynamic in that it includes, in addition to computing machines that are permanent parts of the computer network 104 (e.g., servers), also computing machines that are only temporarily connected to the computer network 104 at a given time (e.g., if a member of an organization, such as an employee of a company, accesses the intranet of the organization from outside the office via a personal device, such as a smartphone). The computing machines 112 may each include one or more (e.g., general-purpose) processors and associated memory; an example computing machine is described in more detail below with reference to FIG. 5.

To protect the computer network 104 from unauthorized access, data theft, malware attacks, or other cyberattacks, the network 104 is monitored, as noted above, by a number of network security tools 102, which may be implemented as software tools running on general-purpose computing hardware (e.g., any of the computing machines 112 within the computer network 104) and/or dedicated, special-purpose hardware security appliances. Non-limiting examples of security tools that may be utilized in the security system 100 include: one or more firewalls that monitor and control network traffic, e.g., via packet filtering according to predetermined rules, establishing a barrier between the computer network 104 and the Internet 114, and optionally between various sub-networks of the computer network 104; anti-malware software to detect and prevent and/or remove malware such as computer viruses, worms, Trojan horses, ransomware, spyware, etc.; intrusion detection and prevention systems that scan network traffic to identify and block attacks (e.g., by comparing network activity against known attack signatures); network anomaly detectors to spot malicious network behavior; authentication and authorization systems to identify users (e.g., by multi-factor authentication) and implement access controls; application security tools to find and fix vulnerabilities in software applications; email security tools to detect and block email-born threats like malware, phishing attempts, and spam; data loss prevention software to detect and prevent data breaches by monitoring sensitive data in storage, in network traffic, and in use; and/or endpoint protection systems, which employ a combination of measures to safeguard data and processes associated with the individual computing machines 112 serving as entry points into the computer network 104.

In some embodiments, comprehensive protection is provided by multiple security tools bundled into an integrated security suite. Sometimes, multiple such integrated security suites from different vendors are even used in combination for complementary protection. Security solutions may employ "security information and events management (SIEM)" to collect, analyze, and report security alerts across the different security products (e.g., different security tools or integrated security suites), e.g., to provide security analysts with aggregate information in a console view or other unified format. Further, to meet the growing complexity and sophistication of cyberattacks, a more recently developed approach that has come to be known in the art as "extended detection and response (XDR)" may perform intelligent automated analysis and correlation of security alerts across security layers (e.g., email, endpoint, server, cloud, network) to discern cyberattacks even in situations where they would be difficult to detect with individual security tools or SIEM. One nonlimiting example of an XDR product is Microsoft 365 Defender.

The security tools 102 generate time-stamped records of security alerts 106 (or, more broadly, "security events," which may include, in addition to security alerts, other events noteworthy to security analysis, such as anomalies in network behavior that may be benign, or network metrics reaching specified thresholds). The security alerts 106 and their associated data—including alert attributes such as, e.g., alert title, alert category, the particular security tool that triggered the alert, threat severity, and the involved entities (machines, users, applications, files, etc.)—are processed in the alert processor 108. The alert processor 108 may be implemented (e.g., as part of or in conjunction with an SIEM or XDR product) in software running on general-purpose computing hardware (e.g., any of the computing machines 112 within the computer network 104), optionally aided by hardware accelerators (e.g., graphic processing units (GPUs), field-programmable gate array (FPGA) or application-specific integrated circuit (ASIC)) configured for certain computationally expensive, but repetitive processing tasks. The alert processor 108 may include sub-components, such as different software modules, implementing various distinct processing functions.

In overview, in accordance with various embodiments, alert processing includes computing, with a suitable hash function 116, hash values (or simply "hashes") 118 of the individual security alerts 106 from their associated data. Further, alert processing involves grouping alerts 106 that are "correlated," e.g., by virtue of shared attribute values, into security incidents 110 by an incident detector 120, and generating incident signature vectors 122 that each represent as security incident 110 as a whole by an incident processor 124. The incident processor 124 may utilize one or more machine-learning (ML) techniques to generate the incident signature vectors 122. To that end, one or more ML models of the incident processor 124 are first trained on a large number of security alerts 106 belonging to a training set comprising multiple (possibly a large number of) security incidents. Once trained, the trained model or models operate on the security alerts 106 of any given security incident 110 individually to compute the respective incident signature vector 122. In accordance with various embodiments, the training involves learning vector encodings of the alerts 106, and then clustering the vector encodings and determining cluster centroids for all clusters. Optionally, the clustering may be repeated multiple times for multiple pre-determined numbers of clusters (e.g., by k-means clustering for multiple values of k), which results in multiple sets of clusters differing in the number of clusters, with each set covering the entirety of alerts. In the subsequent inference phase, the clusters and cluster centroids remain fixed, and the vector encodings of the alerts are assigned to the clusters based on proximity to the cluster centroids. The incident signature vector 122 for a given security incident 110 can then be constructed from counts of alerts of that security incident 110 assigned to the different clusters. Alternatively or additionally, the cluster centroids may be used, in some embodiments, to create alert signature vectors that encode the clusters (e.g., across multiple cluster sets) to which individual alerts are assigned. The computation of alert and incident signature vectors is illustrated in more detail below with reference to FIGS. 2 and 3. The incident signature vectors 122, and the hashes 118 of the security alerts 106 along with identifiers of the clusters to which they belong, may be stored in an incident database 126 of the security system 100.

Based on the incident signature vectors 122, optionally in conjunction with the hashes 118, comparisons between incidents 110 may be performed by an incident similarity component 128 for purposes of analyzing and responding to threats. In some embodiments, groups of similar incidents 110 are identified by first filtering out dissimilar incidents 110 based on the incident signature vectors 122 alone, and then performing a more detailed comparison between the remaining incidents 110 that uses the alert hashes 118 of the constituent security alerts 106 of the remaining incidents 110 in conjunction with the incident signature vectors 122 or their components (that is, the alert counts for the clusters). For a given security incident 110, similar incidents 110 may be identified to provide contextual information for further processing and responding to the incident. At a higher level, information about similarities between security incidents 110 may serve to develop a better understanding of security incidents at large or across multiple organizations. To provide a few examples: information about past security incidents may allow anticipating queries for a new, similar incident, or predicting the growth of an ongoing incident; similar incidents detected in multiple organizations may help identify larger campaigns by bad actors; and security incidents may be grouped based on similarity for purposes of triage.

An incidence response component 130 generates, upon detection of a security incident 110, a suitable output, such as a notification 132 to a security analyst, who may then initiate a mitigating action 134, or the automated initiation of a mitigating action 134. Notifications 132 may, for example, presented in a user interface, e.g., taking the form of an interactive console, that provides an ordered list of security incidents 110 for review by a user (e.g., a security analyst or network administrator), and allows the user to select individual incidents 110 for a more in-depth examination of the constituent security events 106 and associated attributes and other related data. Alternatively or additionally, notifications 132 of high-priority incidents 110, as evaluated by some suitable prioritization metric, may be sent to the user via email, text, or in some other form. Mitigating actions 134, whether taken automatically or initiated by a security analyst or administrator, may include, for example and without limitation: suspending network accounts, requiring that users reset their passwords, isolating affected machines, performing scans for viruses and other malware, de-installing identified malware, sending warnings (e.g., about phishing attacks or email attachments containing malware) to network users, backing up valuable information, increasing the level of network traffic monitoring, etc. In some cases, the incident response component 130 may cause suppression 136 of the incident 110 if it is determined to be a false positive.

The incident response component 130 can utilize the context provided by the incident similarity component 128 to inform the selection or generation of a suitable response. For example, a notification 132 may include data not only for the incident 110 at issue, but also data for other incidents 110 determined to be similar. Such data may include, e.g., any determination of threat actors or threat campaigns responsible for the similar incidents 110, actions taken in response to the similar incidents 110, etc. In some cases, the incident response component 130 may dismiss a security incident 110 as a false positive on the ground that identified similar incidents 110 turned out to be false positives. Conversely, if an active (or "current") incident is similar to a historical false positive incident, a determination that the active incident is a true positive may trigger further review of the historical false positive to check whether it was mis-graded. More generally, pairs of graded similar incidents (e.g., graded as true or false positives, or in terms of their severity) with different grades may be used by an analyst to perform re-evaluation, looking for mis-grades. By providing information about similar past incidents and mitigating actions taken in response, expertise developed by seasoned security analysists can be transferred to colleagues and institutionalized, accelerating the learning curve for new analysists. Moreover, it allows automating threat mitigation in accordance with established response strategies. For instance, the incidence response component 130 may be configured such that, if the similarity of a current incident to prior incidents exceeds a specified threshold similarity, a set of mitigating actions established for that type of incident is automatically implemented. In this manner, the number of security incidents that are escalated to a security analyst for manual review are limited to those incidents which have no sufficient match among the previously encountered incidents.

Figure 2:
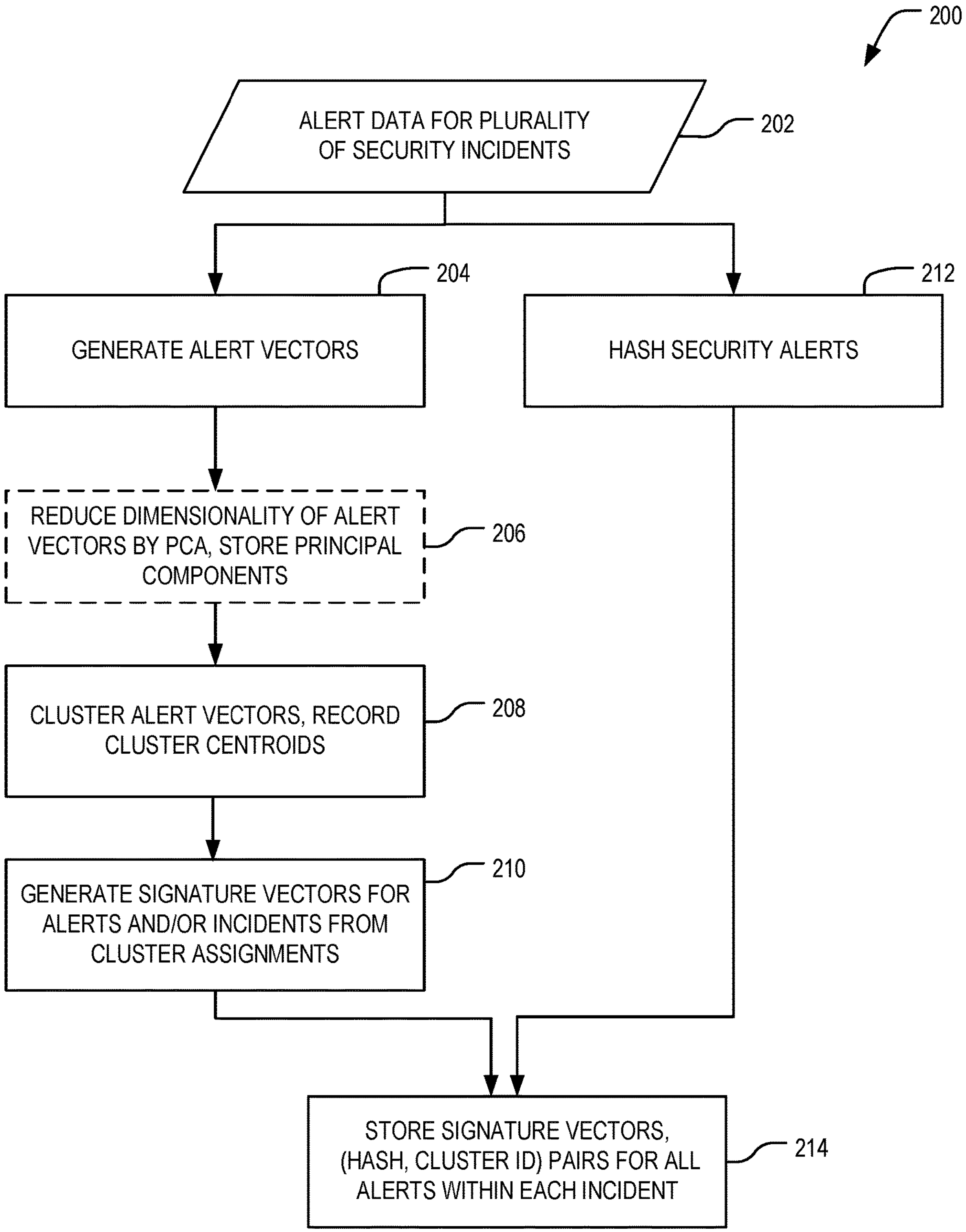
FIG. 2 is a flowchart illustrating a method of creating and training one or more models for measuring similarity between security incidents.

FIG. 2 is a flowchart illustrating an example method 200 of creating and training a model for measuring similarity between security alerts and incidents, along with a library of alerts and incidents for subsequent comparisons. The method 200 operates on input data 202 for security alerts of a plurality of security incidents. A set of features selected or derived from the data for each alert is used to generate an alert vector for the alert (204). The features may include, for example and without limitation, an alert title, an alert product (that is, the security tool that raised the alert), an alert category, and a binary indicator whether a user associated with the alert is one of a number of well-known security identifiers (SIDs), which identify generic users or user groups (e.g., everyone, creator-owner, or administrators). In some embodiments, each feature is one-hot encoded, meaning that a binary vector whose indices correspond to the different categorical values that the feature can take is populated with a 1 at the index whose categorical value the feature has and zeros at all other indices. The one-hot encodings for all features can then be concatenated into a single vector. In alternative embodiments, the alert vectors are computed using a graph-based approach, where security alerts are represented as nodes of a graph and relationships between the security alerts, such as similarity between the features associated with the alerts, are represented as edges between the nodes. A graph-embedding model (e.g., utilizing Laplacian eigenmaps or other factorization-based approaches, a random walk embedding method, a graph neural network (GNNs) or graph convolutional network) may then be used to generate, from the graph, fixed-length graph embedding vectors for all of the nodes that may serve as the alert vectors. Yet another approach is to use a large language model (LLM) to generate alert vectors based on the features. Other methods of generating alert vectors will occur to those of ordinary skill in the art. In some embodiments, initial alert vectors are further processed to reduce their dimensionality, e.g., using principal component analysis (PCA) (206). The vectors that describe, in the initial higher-dimensional space, the principal components resulting from the analysis are stored in memory for subsequent use during the inference phase, and constitute part of the trained model(s).

The alert vectors (following PCA, if applicable) are used in the next step to generate clusters of the alerts (across all incidents) (208). In some embodiments, k-means clustering is employed for multiple values of k to create multiple sets of alert clusters, where each set collectively contains all of the alerts and each individual alert is assigned to one and only one cluster within the set. For example, three cluster sets containing k=8, 15, and 30 alert clusters, respectively, may be created, for a total of 53 alert clusters. The cluster centroids of all alert clusters across all sets are recorded in memory for subsequent use during the inference phase, and constitute part of the trained model. The cluster centroid and principal components constitute a machine-learned model for computing signature vectors of the alerts and/or incidents.

The training phase may also serve to generate a library of alerts and/or incidents against which subsequently detected alerts or incidents can be compared. For this purpose, signature vectors for the alerts and/or incidents are determined based on the cluster memberships of the alerts (210). For example, for each alert, the clusters to which the alert belongs may be encoded in a binary vector, corresponding to a concatenation of one-hot encodings for each cluster set that indicates which cluster within the set the alert belongs to, and this binary vector then serves as the alert signature vector. For instance, in the above example, each alert signature vector is a 53-dimensional vector including three 1's, one for each of the three sets of clusters. Further for each incident, an incident signature vector can be created by summing over the alert signature vectors of all alerts within the incident. Alternatively, the (identical) incident signature vector can be generated directly by counting the alert vectors associated with the incident that fall within each cluster, and assembling the alert counts for all of the clusters into a vector whose dimensionality equals the total number of clusters. The alert signature vectors and/or incident signature vectors may subsequently be used to perform fast similarity measurements between different alerts or incidents. In addition, data associated with each individual alert is hashed with a locality-sensitive hash function, which ensures that similar data is mapped onto similar hash values (212). Locality-sensitive hashing is a well-known concept in the art, and can be accomplished with various suitable methods and algorithms, including, but not limited to, bit sampling for the Hamming distance, min-wise independent permutations ("MinHash"), random projection ("SimHash"), TLSH, and Nilsimsa Hash. For each incident, the computed incident signature vector is stored along with pairs, for each alert within the incident, of the alert hash and a set of identifiers of the clusters to which the alert belongs (214).

Figure 3:
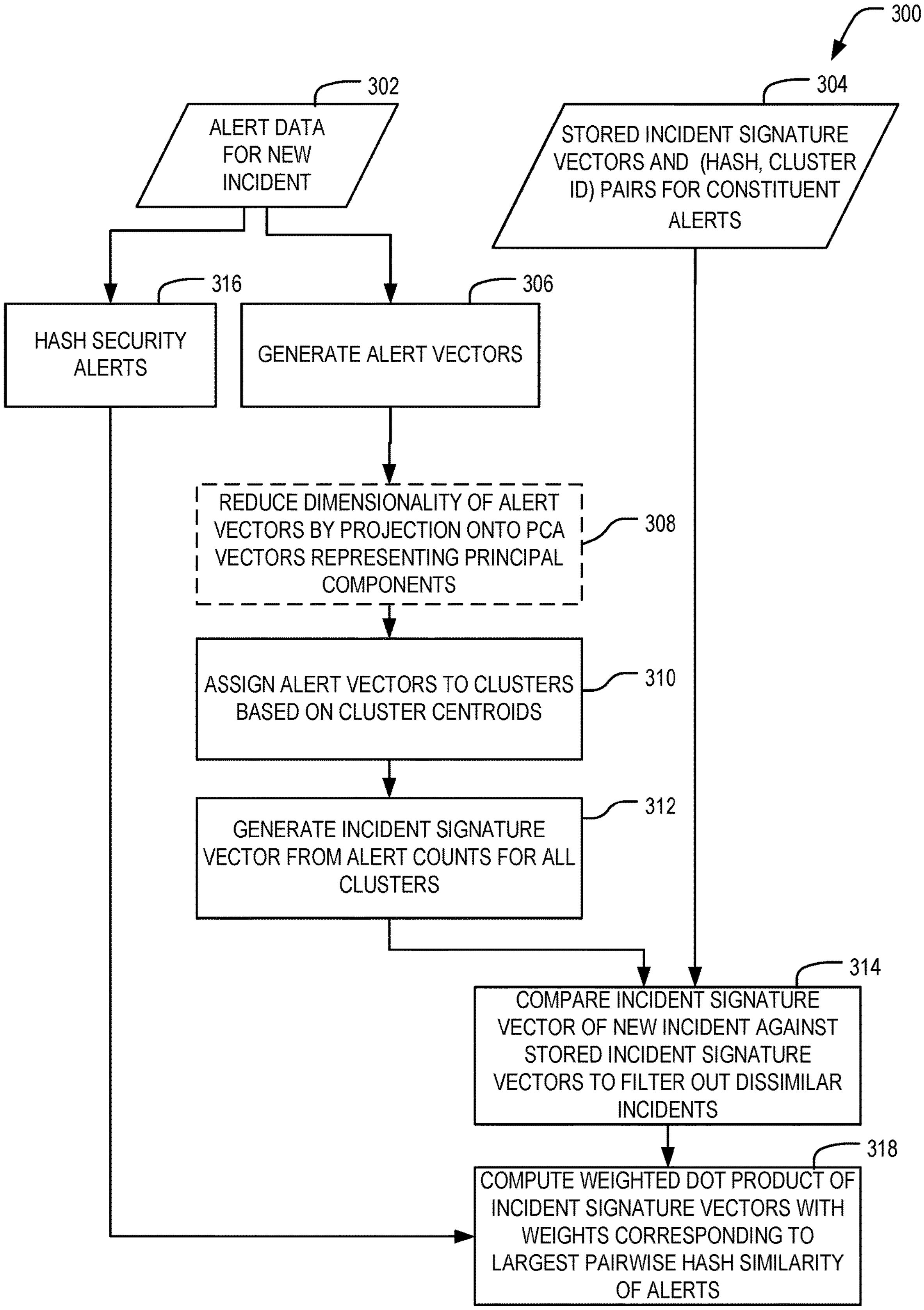
FIG. 3 is a flowchart illustrating a method of measuring similarity between security incidents using the model(s) trained in accordance with FIG. 2.

FIG. 3 is a flowchart illustrating a method 300 of measuring similarity between security incidents using a model and library created in accordance with FIG. 2. The method 300 operates on input data including security alert data 302 for a new incident and, for comparison with the new incident, library data 304 including the previously stored incident signature vectors of previous incidents along with the alert hashes and cluster identifiers of their constituent alerts. Further, the method 300 has access to the cluster centers and, if applicable, the principle components of the model.

To generate an incident signature vector for the new incident, alert vectors are created for the alerts within the incident in the same manner as in the training phase, e.g., using one-hot encodings of features of the alerts and concatenating them across the features (306). If applicable, initial alert vectors thus generated are projected onto the stored PCA vectors describing the principal components to reduce the dimensionality (308). The (dimensionality-reduced) alert vectors are then assigned to the alert clusters created in the training phase based on the stored cluster centroids (310). That is, each alert vector is assigned to the alert cluster with the nearest cluster centroid. An incident signature vector for the new incident is generated from alert counts for the clusters in the same manner as in the training phase, e.g., as the sum of the alert signature vectors of all alerts within the security incident (312), with alert signature vectors encoding the cluster memberships of the alerts and each corresponding to concatenated one-hot vectors for all cluster sets. The incident signature vector for the new incident may then be compared against the incident signature vectors of the stored incidents to filter out dissimilar incidents (314). While this step is, in principle, optional in that the following more detailed incident comparison is not contingent upon it, filtering based on the incident signature vectors alone is computationally inexpensive and, as such, of practical importance for efficient processing whenever the number of incidents to be compared is large. The incident signature vector of the new incident may be compared against any of the stored incident signature vectors in terms of the dot product between the two vectors, or in terms of the cosine similarity (which is the dot product divided by the norms of both vectors). In some embodiments, filtering involves retaining only those of the stored incidents whose dot product with or cosine similarity to the new incident exceeds a specified similarity threshold (e.g., for the cosine similarity, a threshold of 0.9 or some other value between 0 and 1). In other embodiments, the stored incidents are ranked based on their similarity (e.g., measured in terms of the dot product or cosine similarity) to the new incident, and a desired number of the highest-ranking stored incidents are retained.

For a more detailed and interpretable comparison, the data associated with each individual alert of the new incident is hashed with the same locality-sensitive hash function as used in the training phase (316), and the alert hashes are used in conjunction with the incident signature vectors (or, put differently, the alert counts in each cluster that make up the incident signature vectors) to measure the similarity between incidents. For example, in some embodiments, the similarity between two incidents is determined by computing, for each of the alert clusters, the pairwise hash similarity between the alerts within the cluster, determining the largest of the computed pairwise hash similarities, multiplying that largest pairwise hash similarity with the alert counts of the two incidents for the cluster, and summing the product over all alert clusters. Denoting the total number of clusters as n, the incident signature vectors of the two incidents as $v=(v_1, \ldots, v_n)$ and $w=(w_1, \ldots, w_n)$, and the largest hash similarity for cluster i as $s_{i\_max}$, the incident similarity can be written as:

$$\sum_{i=1}^{n} s_{i\_max}(v_i \cdot w_i)$$

That is, the incident similarity is a weighted dot product of the incident signature vectors, where the weight of each component is the largest pairwise hash similarity between alerts within the respective cluster. Optionally, the incident similarity may be normalized by the lengths of the vectors v and w (that is, divided by the norms of both vectors).

Figure 4:
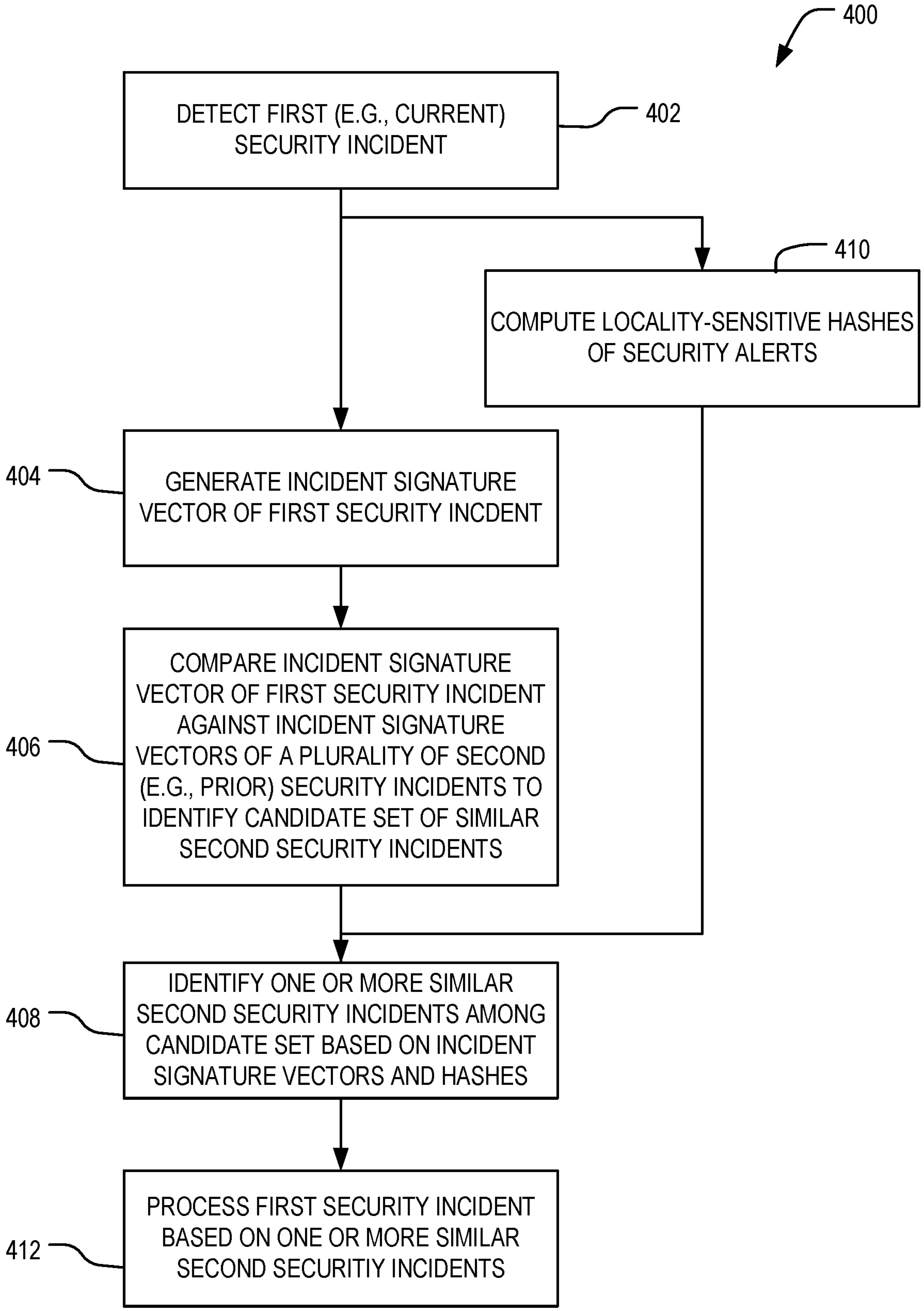
FIG. 4 is a flowchart of an example method 400 of employing incident similarity as measured in accordance herewith for incident response, in accordance with one embodiment.

FIG. 4 is a flowchart of an example method 400 of employing incident similarity as measured in accordance herewith for incident response, in accordance with one embodiment. The method 400 may be implemented, e.g., using the system 100 of FIG. 1. The method 400 involves detecting, based on security alerts issued within a computer network and related monitoring data, a current security incident (herein also "first security incident") (402). From the security alerts associated with that incident, an incident signature vector is computed, e.g., in the manner described with reference to FIG. 3 (404). This incident signature vector is then compared, e.g., in terms of a dot product or cosine similarity, with the incident signature vectors of a plurality of second (e.g., previously detected and processed) security incidents to determine a subset of the second security incidents that are candidate for being similar incidents (406). The candidate set may, for instance, include all second security incidents for which the dot product of their incident signature vector with that of the first security incident exceeds a specified (e.g., empirically determined) threshold. Alternatively, the candidate set may include a fixed number of second security incidents having the highest associated dot products or cosine similarity. The method 400 further includes computing locality-sensitive hashes of the security alerts within the first security incident (408), and using these hashes in comparison with locality-sensitive hashes computed for the second security incidents in the candidate set to determine one or more similar second security incidents (610). As described with respect to FIG. 3, a similarity metric for this purpose may combine the computed hash similarity with the components of the security incident vectors, e.g., in a weighted dot product of the incident signature vectors, where the weight of each component is the largest pairwise hash similarity between alerts within the cluster associated with the respective vector component. Again, a second security incident may be determined to be similar to the first security incident if the weighted dot product or other similarity metric exceeds a specified similarity threshold. Alternatively, the most similar second security incident, or multiple most similar security incidents, as determined based on a ranking by the similarity metric, are selected as the similar incidents. Further processing of the current security incident is based in part on the similar second incident(s). For instance, as described in conjunction with FIG. 1, if the similar second security incidents are past incidents, mitigating action taken in response may be duplicated for the current incident. Or, if the similar second security incidents are concurrent incidents, the first and second security incidents may be analyzed together and addressed jointly with the same or similar mitigating actions.

Figure 5:
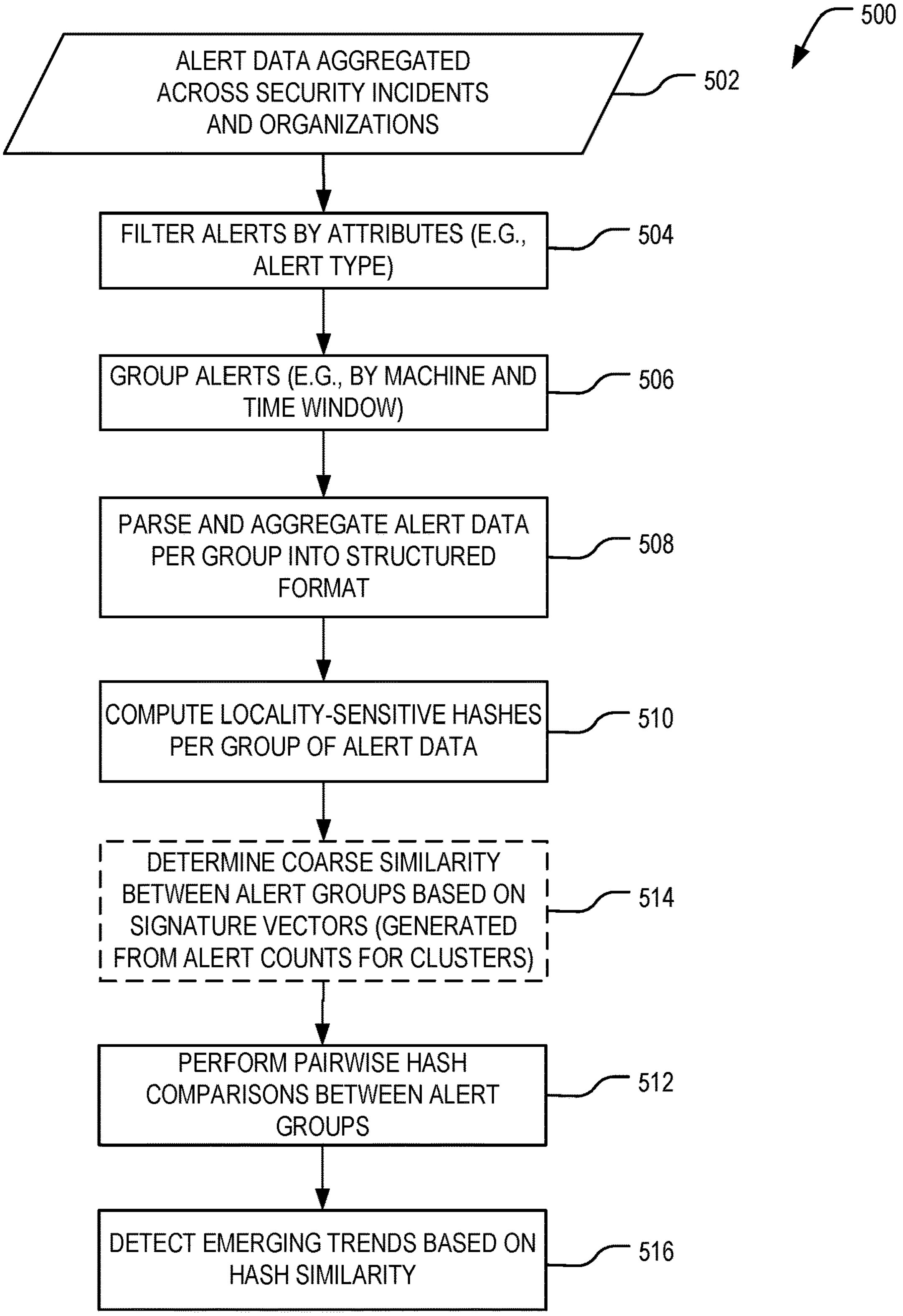
FIG. 5 is a flowchart of an example method in which alert similarity as measured in accordance herewith is used to discover emerging trends in cyberattacks across organizations, in accordance with one embodiment.

FIG. 5 is a flowchart of an example method 500 in which alert similarity as measured based on data hashes is used to discover emerging trends in cyberattacks across organizations, in accordance with one embodiment. Input to the method 500 is alert data 502 (including the security alerts themselves, optionally along with relevant metadata) aggregated across, for instance, security incidents, multiple organizations, and/or an extended period of time (e.g., months). To focus on surfacing emerging cyberattack trends, the security alerts may be filtered based on their attributes (generally a subset of the attributes, herein also "one or more first attributes"), e.g., to consider only alerts of a given type, alerts pertaining to a certain attack vector or technique, alerts associated with a certain program (e.g., an application presenting a security vulnerability), or the like (504). To provide one specific example, a security analyst may be interested in identifying attack campaigns where threat actors are exploiting public-facing web server applications, with the goal of detecting waves of attack activity representing a single attacker (e.g., an individual actor or group of actors acting in concert) performing exploitation across multiple organizations, or waves of exploitation affecting the same web server software, which might indicate a previously unknown vulnerability in that software. To that end, the alert data may be filtered, e.g., by type of alert, to capture various suspicious or malicious activities that are performed via web server processes.

Given the filtered security alerts of interest (that is, the subset of security alerts that is retained after filtering), the alerts and their metadata can be grouped, e.g., by machine and time window (e.g., 6 h windows), or based on some other selected attributes or criteria (herein also "one or more second attributes") (506). The alert data within the groups can then be further processed to generate locality-sensitive hashes for the groups. In some embodiments, as depicted, this is a two-step process, wherein the raw alert data is first parsed and aggregated per group into a data structure that includes only information of interest, e.g., information relevant to subsequent comparisons between groups, such as, to continue the above example, the web server software affected, the underlying activity detected on the web server, and the like (508). The data structure is then sent through a locality-sensitive hash function to generate a locality-sensitive hash for the group, which may be stored along with metadata about the alert aggregation (e.g., start/end times, machine, organization, etc.) (510).

With the alerts and their associated data filtered, grouped, and hashed in these ways, a locality-sensitive hash representing the alert data of one group can be compared to the locality-sensitive hashes of alert data in other groups of the same alert type or filter, e.g., using a locality-sensitive hash comparison function to iterate through the dataset at large, computing pairwise hash similarity between the groups of alerts (512). In some embodiments, to facilitate efficient comparisons between large amounts of data, signature vectors for groups of alerts are created in a similar manner as described above with reference to FIGS. 2 and 3. For instance, the individual alerts may be represented by alert vectors that are assigned to alert clusters created during a training phase, and a signature vector for a group of alerts can then be created based on alert counts for the clusters. For example, the alert clusters to which a given alert vector belongs may be encoded in a binary vector, e.g., corresponding to a concatenation of one-hot encodings for each of multiple cluster sets (e.g., resulting from k-means clustering for multiple values of k) that indicates which cluster within the set the alert vector belongs to. The signature vector for the group may then be determined as the sum of the binary vectors of the alerts within the group. The signature vectors for the groups of alerts may be used as a coarse filter to eliminate pairs of dissimilar alert groups and limit hash comparison to pairs of alert groups whose signature vectors have a certain level of similarity (514).

Locality-sensitive hashes that have high similarity with other locality-sensitive hashes may indicate emerging cyber-attack trends or activity, e.g., when similar groups of alerts, along with their associated similar underlying data, are observed across multiple machines or organizations, especially within overlapping time frames. Accordingly, the hash comparisons and alert groups identified as similar based on their hashes may be used to detect emerging trends (516). In this way, it becomes easier to surface cyberattacks across disparate organizations that are employing a common attack technique or attack vector, targeting a shared specific application vulnerability, are being carried out by the same threat actor or group, and so on. Grouping by metadata associated with the hashes, e.g., machines or organizations, allows making correlations based on machine or organizations count. For example, having observed some suspicious or malicious activity at one organization, it may be discovered that alert groupings at a number of (e.g., six) additional organizations that have a high (e.g., 90%) similarity in their associated activity all affect the same web server application. In some embodiments, the generation of locality-sensitive hashes and their use in determining similar alert groups is automated, whereas the review of the involved data is a manual process, e.g., taking place via a dashboard of a security application. In other embodiments, further automation, such as, e.g., automatic sending of emails or alerts in response to highly significant activity observed across a specified number of organizations or machines, provides an automated method of surfacing emerging cyberattack trends.

Figure 6:
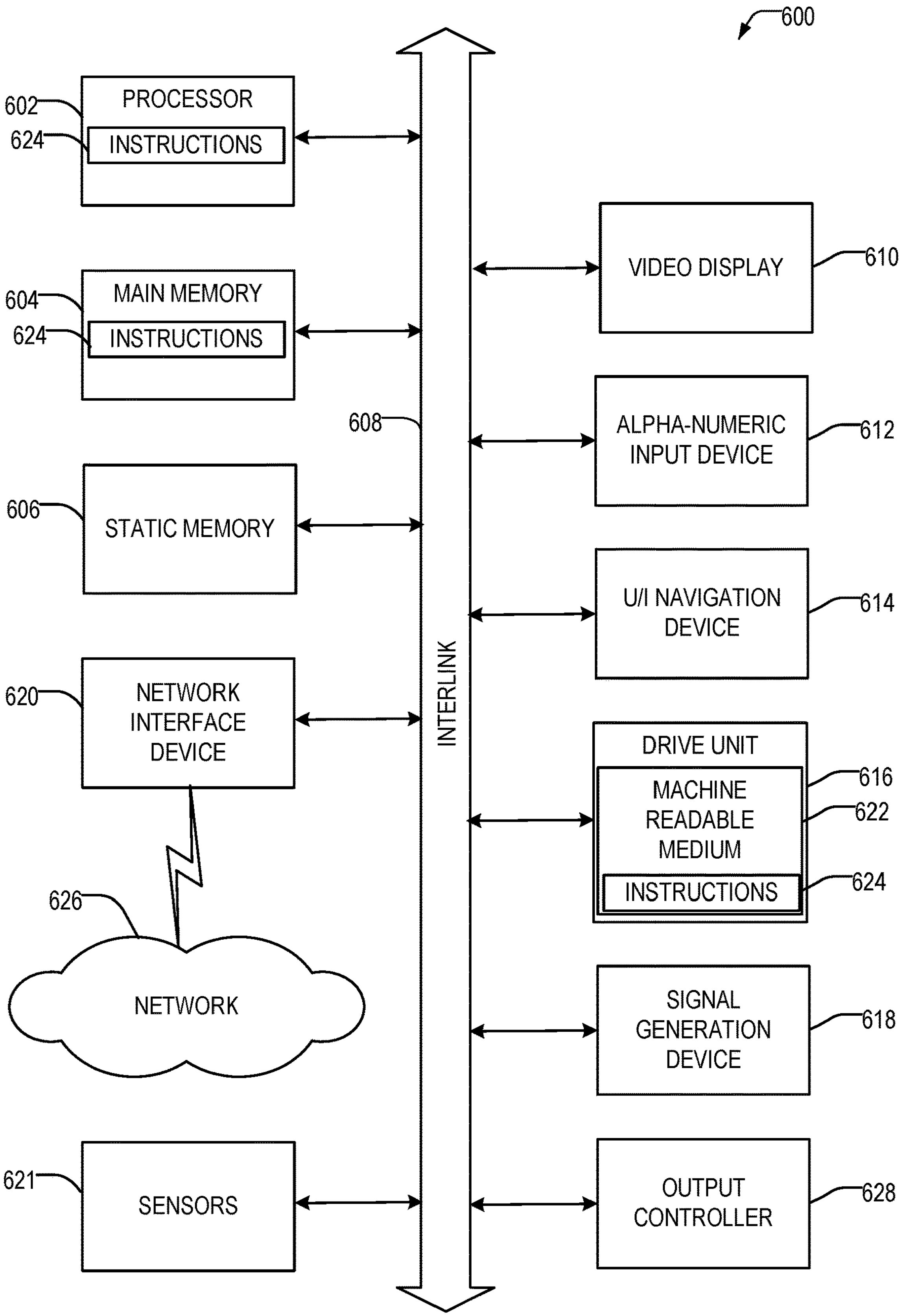
FIG. 6 illustrates a block diagram of an example machine upon which any one or more of the techniques discussed herein may perform.

FIG. 6 illustrates a block diagram of an example machine 600 upon which any one or more of the techniques discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In various embodiments, machine(s) 600 may perform one or more of the processes described above with respect to FIGS. 2-5. For example, within the system 100 of FIG. 1, one or more machines 600 may implement any of computing machines 112, any of the security tools 102 for generating security alerts, and/or any of the components 116, 120, 124, 128, 130 of the alert processor 108.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine-readable medium 622 on which are stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 504, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

The term "machine-readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that are not a transitory propagating signal.

The instructions 624 may further be transmitted or received over a communications network 626 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments:

Example 1 is a computer-implemented method including: detecting, in a computer network, a first security incident comprising constituent first security alerts; determining first locality-sensitive hashes for the first security alerts based on data associated with the first security alerts; generating alert vectors for the first security alerts based on data associated with the first security alerts; assigning the alert vectors to alert clusters based on learned cluster centroids of the alert clusters; determining alert counts of the first security alerts for the alert clusters; determining similarities between the first security incident and second security incidents comprising constituent second security alerts, the similarities based on the alert counts of the first security alerts for the alert clusters, alert counts of the second security alerts for the alert clusters, and similarities between the first locality-sensitive hashes and second locality-sensitive hashes computed for the second security alerts; identifying among the second security incidents, based on the similarities, at least one similar second security incident; and processing the first security incident based at least in part on the at least one similar second security incident.

Example 2 is the method of example 1, wherein processing the first security incident based at least in part on the at least one similar second security incident comprises automatically performing a mitigating action to address the first security incident, the mitigating action based at least in part on data pertaining to the at least one similar second security incident.

Example 3 is the method of example 2, wherein the mitigating action is based at least in part on a mitigating action taken in response to the at least one similar second security incident.

Example 4 is the method of any of examples 1-3, wherein processing the first security incident based at least in part on the at least one similar second security incident comprises generating a notification about the first security incident, the notification comprising data pertaining to the at least one second security incident.

Example 5 is the method of any of examples 1-4, wherein processing the first security incident based at least in part on the at least one similar second security incident comprises grouping the first security incident and the at least one similar second security incident for analysis and mitigation.

Example 6 is the method of any of examples 1-5, wherein determining the similarities includes filtering the second security incidents based on comparisons between a first incident signature vector comprising the alert counts of the first security alerts for the alert clusters and second incident signature vectors comprising the alert counts of the second security alerts for the alert clusters to determine candidate similar second security incidents; identifying the at least one similar second security incident among the candidate similar second security incidents based at least in part on similarities between the first locality-sensitive hashes and the second locality-sensitive hashes.

Example 7 is the method of example 6, wherein the comparisons between the first incident signature vector and the second incident signature vectors comprise dot products between the first incident signature vector and the second incident signature vectors, and wherein the candidate similar second security incidents are associated with dot products exceeding a specified threshold.

Example 8 is the method of any of examples 1-7, wherein determining the similarities includes, for each of at least a subset of the second security incidents and its associated second security alerts: determining, for the alert clusters, largest pairwise hash similarities between the first locality-sensitive hashes of first security alerts within the respective alert cluster and second locality-sensitive hashes of the second security alerts within the respective alert cluster; and determining a similarity metric comprising a sum, over the alert clusters, of products of the respective largest pairwise hash similarity for the alert cluster, the respective alert count of the first security alerts for the alert cluster and the alert count of the second security alerts for the alert cluster.

Example 9 is the method of example 8, wherein identifying the at least one similar second security incident comprises identifying, among the second security incident within the subset, at least one second security incident whose associated similarity metric exceeds a specified threshold.

Example 10 is the method of example 8, wherein identifying the at least one similar second security incident comprises ranking the second security incidents within the subset based on the similarity metric, and identifying one or more highest-ranking second security incidents.

Example 11 is the method of any of examples 1-10, further including, prior to assigning the alert vectors to the alert clusters, determining the alert clusters and their cluster centroids by clustering alert vectors generated from a training dataset of security alerts within a plurality of security incidents.

Example 12 is the method of example 11, wherein the clustering comprising k-means clustering.

Example 13 is the method of any of examples 1-12, wherein generating the alert vectors for the first security alerts comprises determining one-hot encodings of alert features of the first security alerts and concatenating the one-hot encodings.

Example 14 is the method of any of examples 1-12, wherein generating the alert vectors for the first security alerts comprises generating a graph of the first security incident that represents the first security alerts as nodes and relationships between the first security alerts as edges, and determining graph embeddings of the nodes from the graph, the graph embeddings constituting the alert vectors.

Example 15 is the method of any of examples 1-14, wherein generating the alert vectors comprises generating initial alert vectors and projecting the initial alert vectors onto pre-computed principal component analysis (PCA) axes to compute alert vectors of reduced dimensionality.

Example 16 is the method of example 15, further including, prior to projecting the initial alert vectors, determining the PCA axes by performing PCA on alert vectors generated from a training dataset of security alerts within a plurality of security incidents.

Example 17 is the method of any of examples 1-16, wherein the alert clusters comprise multiple sets of alert clusters different in numbers of clusters, each set of alert clusters containing the alert vectors for the first security alerts in their entirety and each alert vector being assigned to one and only one alert cluster within each set.

Example 18 is a system including one or more computer processors, and one or more machine-readable media storing processor-readable instructions which, when executed by the one or more computer processors, cause the one or more computer processors to perform operations implementing the method of any of examples 1-17.

Example 19 is one or more machine-readable media storing processor-readable instructions which, when executed by one or more computer processors, cause the one or more computer processors to perform operations implementing the method of any of examples 1-17.

Example 20 is a computer-implemented method including: receiving security alert data for a set of security alerts; filtering the set of security alert data by one or more first attributes to retain a subset of security alerts; grouping the security alerts within the subset based on one or more second attributes; generating data structures for groups of security alerts from the security alert data associated with the security alerts within the groups; determining locality-sensitive hashes for the groups of security alerts based on the data structures; performing pairwise comparisons between the locality-sensitive hashes; and detecting an emerging cyberattack based on the pairwise comparisons.

Example 21 is the method of example 20, wherein the security alert data for the set of security alerts is aggregated across multiple organizations, and wherein the emerging cyberattack is detected based at least in part on similarity of the locality-sensitive hashes between groups of security alerts associated with multiple of the organizations.

Example 22 is the method of example 21, further comprising, in response to detection of the emerging cyberattack, automatically sending notifications of the emerging cyberattack to the multiple organizations.

Example 23 is the method of any of examples 20-22, wherein the first attributes comprise at least one of an alert type, an attack vector or technique, or an associated program.

Example 24 is the method of any of examples 20-23, wherein the second attributes comprise at least one of a machine or a time window.

Example 25 is the method of any of examples 20-24, further including: generating alert vectors for the security alerts and assigning the alert vectors to alert clusters based on learned cluster centroids of the alert clusters; determining alert counts of the groups of security alerts for the alert clusters and generating signature vectors for the groups of security alerts based on the alert counts; and determining coarse pairwise similarity between the groups of security alerts based on comparisons between their signature vectors, wherein the pairwise comparisons between the locality-sensitive hashes are limited to pairs of groups of security alerts whose associated signature vector exceed a threshold level of similarity.

Example 27 is the method of any of examples 20-26, further including: generating alert vectors for the groups of security alerts and assigning the alert vectors to alert clusters based on learned cluster centroids of the alert clusters; generating signature vectors for the groups of security alerts based on the assigning; and determining coarse pairwise similarity between the groups of security alerts based on comparisons between their signature vectors, wherein the pairwise comparisons between the locality-sensitive hashes are limited to pairs of groups of security alerts whose associated signature vector exceed a threshold level of similarity.

Example 28 is a system including one or more computer processors, and one or more machine-readable media storing processor-readable instructions which, when executed by the one or more computer processors, cause the one or more computer processors to perform operations implementing the method of any of examples 20-27.

Example 29 is one or more machine-readable media storing processor-readable instructions which, when executed by one or more computer processors, cause the one or more computer processors to perform operations implementing the method of any of examples 20-27.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A computer-implemented method comprising:

detecting, in a computer network, a first security incident comprising constituent first security alerts;

determining first locality-sensitive hashes for the first security alerts based on data associated with the first security alerts;

generating alert vectors for the first security alerts based on data associated with the first security alerts;

assigning the alert vectors to alert clusters based on learned cluster centroids of the alert clusters;

determining alert counts of the first security alerts for the alert clusters;

determining similarities between the first security incident and second security incidents comprising constituent second security alerts, the similarities based on;

(i) a first incident signature vector comprising the alert counts of the first security alerts for the alert clusters and second incident signature vectors comprising the alert counts of the second security alerts for the alert clusters, and (ii) similarities between the first locality-sensitive hashes and second locality-sensitive hashes computed for the second security alerts;

identifying among the second security incidents, based on the similarities, at least one similar second security incident; and processing the first security incident based at least in part on the at least one similar second security incident.

2. The method of claim 1, wherein processing the first security incident based at least in part on the at least one similar second security incident comprises automatically performing a mitigating action to address the first security incident, the mitigating action based at least in part on data pertaining to the at least one similar second security incident.

3. The method of claim 2, wherein the mitigating action is based at least in part on a mitigating action taken in response to the at least one similar second security incident.

4. The method of claim 1, wherein processing the first security incident based at least in part on the at least one similar second security incident comprises generating a notification about the first security incident, the notification comprising data pertaining to the at least one second security incident.

5. The method of claim 1, wherein processing the first security incident based at least in part on the at least one similar second security incident comprises grouping the first security incident and the at least one similar second security incident for analysis and mitigation.

6. The method of claim 1, wherein determining the similarities comprises:

filtering the second security incidents based on comparisons between the first incident signature vector and the second incident signature vector to determine candidate similar second security incidents; and identifying the at least one similar second security incident among the candidate similar second security incidents based at least in part on similarities between the first locality-sensitive hashes and the second locality-sensitive hashes.

7. The method of claim 6, wherein the comparisons between the first incident signature vector and the second incident signature vectors comprise dot products between the first incident signature vector and the second incident signature vectors, and wherein the candidate similar second security incidents are associated with dot products exceeding a specified threshold.

8. The method of claim 1, wherein determining the similarities comprises, for each of at least a subset of the second security incidents and its associated second security alerts:

determining, for the alert clusters, largest pairwise hash similarities between the first locality-sensitive hashes of first security alerts within the respective alert cluster and second locality-sensitive hashes of the second security alerts within the respective alert cluster; and determining a similarity metric comprising a sum, over the alert clusters, of products of the respective largest pairwise hash similarity for the alert cluster, the respective alert count of the first security alerts for the alert cluster and the alert count of the second security alerts for the alert cluster.

9. The method of claim 8, wherein identifying the at least one similar second security incident comprises identifying, among the second security incident within the subset, at least one second security incident whose associated similarity metric exceeds a specified threshold.

10. The method of claim 8, wherein identifying the at least one similar second security incident comprises ranking the second security incidents within the subset based on the similarity metric, and identifying one or more highest-ranking second security incidents.

11. The method of claim 1, further comprising:

prior to assigning the alert vectors to the alert clusters, determining the alert clusters and their cluster centroids by clustering alert vectors generated from a training dataset of security alerts within a plurality of security incidents.

12. The method of claim 11, wherein the clustering comprising k-means clustering.

13. The method of claim 1, wherein generating the alert vectors for the first security alerts comprises determining one-hot encodings of alert features of the first security alerts and concatenating the one-hot encodings.

14. The method of claim 1, wherein generating the alert vectors for the first security alerts comprises generating a graph of the first security incident that represents the first security alerts as nodes and relationships between the first security alerts as edges, and determining graph embeddings of the nodes from the graph, the graph embeddings constituting the alert vectors.

15. The method of claim 1, wherein generating the alert vectors comprises generating initial alert vectors and projecting the initial alert vectors onto pre-computed principal component analysis (PCA) axes to compute alert vectors of reduced dimensionality.

16. The method of claim 15, further comprising:

prior to projecting the initial alert vectors, determining the PCA axes by performing PCA on alert vectors generated from a training dataset of security alerts within a plurality of security incidents.

17. The method of claim 1, wherein the alert clusters comprise multiple sets of alert clusters different in numbers of clusters, each set of alert clusters containing the alert vectors for the first security alerts in their entirety and each alert vector being assigned to one and only one alert cluster within each set.

18. A system comprising:

one or more computer processors; and one or more non-transitory machine-readable media storing processor-readable instructions which, when executed by the one or more computer processors, cause the one or more computer processors to perform operations comprising:

detecting, in a computer network, a first security incident comprising constituent first security alerts;

determining first locality-sensitive hashes for the first security alerts based on data associated with the first security alerts;

generating alert vectors for the first security alerts based on data associated with the first security alerts;

assigning the alert vectors to alert clusters based on learned cluster centroids of the alert clusters;

determining alert counts of the first security alerts for the alert clusters;

determining similarities between the first security incident and of second security incidents comprising constituent second security alerts, the similarities based on:

(i) a first incident signature vector comprising the alert counts of the first security alerts for the alert clusters and second incident signature vectors comprising the alert counts of the second security alerts for the alert clusters, and (ii) similarities between the first locality-sensitive hashes and second locality-sensitive hashes computed for the second security alerts;

identifying among the second security incidents, based on the similarities, at least one similar second security incident; and automatically performing a mitigating action to address the first security incident, the mitigating action based at least in part on data pertaining to the at least one similar second security incident.

19. The system of claim 18, wherein determining the similarities comprises:

filtering the second security incidents based on comparisons between the first incident signature vector and the second incident signature vectors to determine candidate similar second security incidents;

identifying the at least one similar second security incident among the candidate similar second security incidents based at least in part on similarities between the first locality-sensitive hashes and the second locality-sensitive hashes.

20. One or more non-transitory machine-readable media storing processor-readable instructions which, when executed by one or more computer processors, cause the one or more computer processors to perform operations comprising:

detecting, in a computer network, a first security incident comprising constituent first security alerts;

determining first locality-sensitive hashes for the first security alerts based on data associated with the first security alerts;

generating alert vectors for the first security alerts based on data associated with the first security alerts;

assigning the alert vectors to alert clusters based on learned cluster centroids of the alert clusters;

determining alert counts of the first security alerts for the alert clusters;

determining a first incident signature vector comprising the alert counts of the first security alerts for the alert clusters;

obtaining, for second security incidents comprising second security alerts, respective second incident signature vectors comprising alert counts of the second security alerts for the alert clusters;

identifying candidate similar second security incidents among the second security incidents based on comparisons between the first incident signature vector and the second incident signature vectors;

identifying at least one similar second security incident among the candidate similar second security incidents based at least in part on similarities between the first locality-sensitive hashes and the second locality-sensitive hashes; and processing the first security incident based at least in part on the at least one similar second security incident.

* * * * *